(12) United States Patent
Beauvisage et al.

(10) Patent No.: US 12,403,933 B2
(45) Date of Patent: Sep. 2, 2025

(54) DETERMINING A STATE OF A VEHICLE ON A ROAD

(71) Applicant: ZENSEACT AB, Gothenburg (SE)

(72) Inventors: Axel Beauvisage, Gothenburg (SE); Junsheng Fu, Nödinge (SE); Theodor Stenhammar, Gothenburg (SE); David Bejmer, Gothenburg (SE)

(73) Assignee: ZENSEACT AB, Gothenburg (SE)

( * ) Notice: Subject to any disclaimer, the term of this patent is extended or adjusted under 35 U.S.C. 154(b) by 223 days.

(21) Appl. No.: 18/317,185

(22) Filed: May 15, 2023

(65) Prior Publication Data

US 2023/0365154 A1   Nov. 16, 2023

(30) Foreign Application Priority Data

May 16, 2022  (EP) ..................................... 22173553

(51) Int. Cl.
*B60W 50/00* (2006.01)
*B60W 60/00* (2020.01)
*G01C 21/30* (2006.01)

(52) U.S. Cl.
CPC .......... *B60W 60/001* (2020.02); *B60W 50/00* (2013.01); *G01C 21/30* (2013.01);
(Continued)

(58) Field of Classification Search
CPC ............... B60W 60/001; B60W 50/00; B60W 2050/0052; B60W 2420/00; B60W 2530/00; G01C 21/30
(Continued)

(56) References Cited

U.S. PATENT DOCUMENTS 6,064,320 A  *  5/2000  d'Hont ................. G07B 15/063
                                                      342/51
2014/0257686 A1 *  9/2014  Feldman ......... B60W 30/18163
                                                      701/300
(Continued)

FOREIGN PATENT DOCUMENTS

CN          114333335 A  *  4/2022

OTHER PUBLICATIONS

Bartiomiej Placzek, Selective data collection in vehicular networks for traffic control applications, Dec. 16, 2011, Transportation Research Part C, Elsevier (Year: 2011).*

(Continued)

*Primary Examiner* — Matthias S Weisfeld
(74) *Attorney, Agent, or Firm* — Sage Patent Group

(57) ABSTRACT

The present invention relates to determination of a state of a vehicle on a road portion. The vehicle includes an Automated Driving System (ADS) feature. At first, map data associated with the road portion, positioning data indicating a pose of the vehicle on the road, and sensor data of the vehicle are obtained. Then, a plurality of filters for the road portion are initialized. Further, one or more sensor data point(s) in the obtained sensor data is associated to a corresponding map-element of the obtained map data to determine one or more normalized similarity score(s). Now, based on the determined one or more normalized similarity score(s), one or more multivariate time-series data are also determined and provided as input to a trained machine-learning algorithm. Then, one of the initialized filters is selected by the machine learning algorithm to indicate a current state of the vehicle on the road portion.

15 Claims, 5 Drawing Sheets

(52) U.S. Cl.
CPC . *B60W 2050/0052* (2013.01); *B60W 2420/00* (2013.01); *B60W 2530/00* (2013.01)

(58) Field of Classification Search
USPC .......................................................... 701/27
See application file for complete search history.

(56) References Cited

U.S. PATENT DOCUMENTS

| 2014/0379164 | A1* | 12/2014 | Joh | ........................ | G01C 21/30 |
| | | | | | 701/1 |
| 2017/0016740 | A1 | 1/2017 | Cui et al. | | |
| 2020/0232806 | A1 | 7/2020 | Goldman et al. | | |

OTHER PUBLICATIONS

Choi Kyoungtaek et al: "Detection-Verification-Cascade-Based Low-Cost Precise Vehicle Positioning Exploiting Extended Digital Map"; IEEE Access, IEEE, USA, vol. 9; Jan. 8, 2021; pp. 11065-11079 (15 pages).
European Search Report mailed Nov. 23, 2022 for European Application No. 22173553.3, 5 pages.

* cited by examiner

DETERMINING A STATE OF A VEHICLE ON A ROAD

CROSS-REFERENCE TO RELATED APPLICATIONS

The present application for patent claims priority to European Patent Office Application Ser. No. 22173553.3, entitled "DETERMINING A STATE OF A VEHICLE ON A ROAD" filed on May 16, 2022, assigned to the assignee thereof, and expressly incorporated herein by reference.

TECHNICAL FIELD

The present disclosure relates to methods and systems for determining a state of a vehicle on a road. More specifically, embodiments and aspects of the present disclosure relate to initialization of filters for the vehicle on a road and systems and methods for selection of the initialized filters by means of machine learning algorithms to determine the state of the vehicle on the road.

BACKGROUND

During the last few years, the research and development activities related to autonomous vehicles have exploded in number and many different approaches are being explored. An increasing portion of modern vehicles have advanced driver-assistance systems (ADAS) to increase vehicle safety and more generally road safety. ADAS—which for instance may be represented by adaptive cruise control (ACC) collision avoidance system, forward collision warning, etc. —are electronic systems that may aid a vehicle driver while driving. Today, there is ongoing research and development within a number of technical areas associated to both the ADAS and the Autonomous Driving (AD) field. ADAS and AD will herein be referred to under the common term Automated Driving System (ADS) corresponding to all of the different levels of automation as for example defined by the SAE J3016 levels (0-5) of driving automation, and in particular for level 4 and 5.

In a not too distant future, ADS solutions are expected to have found their way into a majority of the new cars being put on the market. An ADS may be construed as a complex combination of various components that can be defined as systems where perception, decision making, and operation of the vehicle are performed by electronics and machinery instead of a human driver, and as introduction of automation into road traffic. This includes handling of the vehicle, destination, as well as awareness of surroundings. While the automated system has control over the vehicle, it allows the human operator to leave all or at least some responsibilities to the system. An ADS commonly combines a variety of sensors to perceive the vehicle's surroundings, such as e.g. radar, LIDAR, sonar, camera, navigation system e.g. GPS, odometer and/or inertial measurement units (IMUs), upon which advanced control systems may interpret sensory information to identify appropriate navigation paths, as well as obstacles, free-space areas, and/or relevant signage.

An important requirement for autonomous and semi-autonomous vehicles is that they are able to estimate the pose i.e. the state (position and orientation) of the vehicle with accuracy and consistency since this is an important safety aspect when the vehicle is moving within traffic. Conventionally, satellite based positioning systems (Global Navigation Satellite Systems, GNSS), like for instance Global Positioning System (GPS), Globalnaya Navigazion-naya Sputnikovaya Sistema (GLONASS), Galileo, Beidou, have been used for positioning purposes.

However, these and other regional systems are often not accurate enough to rely on solely for determining the pose of a moving vehicle in autonomous applications. Moreover, GNSS based solutions have even less accuracy in determining height information.

Alternatively, there are systems and methods which utilize HD-map information together with a number of different sensors to increase the reliability of the map position such as cameras, LIDAR, RADAR, and other sensors for determining vehicle travelling parameters such as speed, angular rate and so on. However, even given current vehicle pose, it is still hard to predict a robust vehicle pose estimation by only odometry due to the measurement noise from different measurement sensors, e.g. motion sensors.

There is thus a need in the art for new and improved solutions for determining the state of the vehicle on the road with more certainty and accuracy.

SUMMARY

It is therefore an object of the present invention to provide a system, a vehicle comprising such a system, a method, and a computer-readable storage medium, which alleviate all or at least some of the drawbacks of presently known solutions.

More specifically, it is an object of the present invention to alleviate problems related to determination of state of a vehicle comprising an Automated Driving System (ADS) feature on a road portion having two or more lanes.

These objects are achieved by means of a system, a vehicle comprising such a control system, a method, and a computer-readable storage medium, as defined in the appended independent claims. The term exemplary is in the present context to be understood as serving as an instance, example or illustration.

According to a first aspect of the present invention, there is provided a method for determining a state of a vehicle on a road portion having two or more lanes, the vehicle comprising an Automated Driving System (ADS) feature. The method comprises obtaining map data associated with the road portion and obtaining positioning data indicating a pose of the vehicle on the road and obtaining sensor data from a sensor system of the vehicle. Further the method comprises initializing a plurality of filters for the road portion wherein one filter is initialized per lane of the road portion based on the obtained map data, the obtained positioning data, and the obtained sensor data, wherein each filter indicates an estimated state of the vehicle on the road portion. Additionally, the method comprises associating one or more sensor data point(s) in the obtained sensor data to a corresponding map-element of the obtained map data and determining one or more normalized similarity score(s) between the associated obtained map data and the obtained sensor data. Further, the method comprises determining one or more multivariate time-series data based on the determined one or more normalized similarity score(s), wherein each multivariate time-series data is attributed to a corresponding initialized filter among the plurality of initialized filters. In addition, the method comprises providing the one or more multivariate time-series data as input to a trained machine-learning algorithm. The trained machine learning algorithm is configured for determining a confidence probability value for each initialized filter of the plurality of initialized filters by means of a probabilistic classifier. Further the machine learning algorithm is configured for selecting one of the initialized filters, by comparing the confidence probability values determined for each initialized filter in conjunction with one or more multi-objective optimized coefficient(s), each optimized coefficient being indicative of an optimization, e.g. an optimized trade-off, between a readiness performance indicator and an accuracy performance indicator for selecting a single initialized filter as an output of the machine learning algorithm. The output of the machine learning algorithm is indicative of a current state of the vehicle on the road portion. The method further comprises controlling the ADS feature of the vehicle based on the selected initialized filter.

When it comes to autonomous vehicles, an accurate localization of the vehicle state is of great importance in order to make safe decisions without endangering a vehicle's occupants or external objects, particularly when using the ADS features.

According to the presented method, by employing a data-driven approach comprising the use of machine learning algorithms to identify and select the most promising initialized filter out of the plurality of initialized filters per lane of a multi-lane road, the possibilities of accurately and efficiently estimating the state of the vehicle on the road portion are noticeably improved. This advantage is particularly noteworthy in comparison with rule-based algorithm designs for identifying the most accurate initialized filter indicative of the state of the vehicle on the road portion. Even though the rule-based approaches may be capable of accurately determining the state of the vehicle on the road portion, the likelihood of avoiding unforeseeable corner cases is considerably enhanced by training and employing the machine learning algorithm according to the present invention.

To this end, the trained machine learning algorithm is used to influence and promote behavior that leads to an increased possibility of generating interesting scenarios, including the corner case scenarios involving multiple environmental variables or conditions happening simultaneously or outside the conventional levels. Further, the versatility of the proposed solution establishes the proposed method, and corresponding system and vehicle to be readily adaptable for varying traffic situations or road and transportation infrastructure in different countries.

According to some embodiments, each initialized filter may be one of a Bayesian filter and a combination of multiple Bayesian filters. In several embodiments, each Bayesian filter may be one of Kalman Filter, Extended Kalman Filter, EKF, Unscented Kalman Filter, UKF, Cubature Kalman Filter, CKF, and Particle Filter, PF.

In various embodiments, the obtained sensor data may comprise information about a state of one or more other vehicles in the surrounding environment of the vehicle, lane marker geometry, lane marker type, traffic sign information, road barrier information, and Inertial Measurement Unit, IMU, data. In various embodiments the map data may comprise HD-map data.

In some embodiments, the method may further comprise determining one or more normalized similarity score(s) between the associated obtained map data and the obtained sensor data by computing an association cost value for each sensor data point of the one or more sensor data point(s) associated to a corresponding map element; and selecting a sensor data point and map-element combination having the smallest association cost value.

In several embodiments, the method may further comprise determining the one or more multivariate time-series data based on the determined one or more normalized similarity score(s) by obtaining one or more time-dependent feature(s) of each determined normalized similarity score.

In some embodiments, the trained machine learning algorithm may be further configured for sorting the determined confidence probability values for the plurality of the initialized filters based on the confidence level of each determined confidence probability value.

In several embodiments, for each optimized coefficient the readiness performance indicator may comprise any one of an availability performance indicator comprising a proportion of the one or more multivariate time-series data for which a selection of a single initialized filter is performed by the trained machine learning algorithm. The readiness performance indicator may further comprise an earliness performance indicator comprising an average fraction passed of the one or more multivariate time-series data before a selection of a single initialized filter is performed by the trained machine learning algorithm. Further for each optimized coefficient the performance accuracy indicator may comprise a proportion of correctly-selected single initialized filters by the trained machine learning algorithm, being indicative of the current state of the vehicle on the road portion.

According to a second aspect of the present invention there is provided a (non-transitory) computer-readable storage medium storing one or more programs configured to be executed by one or more processors of a processing system, the one or more programs comprising instructions for performing the method according to any one of the embodiments of the method disclosed herein.

The term "non-transitory," as used herein, is intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link. Thus, the term "non-transitory", as used herein, is a limitation of the medium itself (i.e., tangible, not a signal) as opposed to a limitation on data storage persistency (e.g., RAM vs. ROM).

According to a third aspect of the present invention, there is provided a computer program product comprising instructions which, when the program is executed by one or more processors of a processing system, causes the processing system to carry out the method according to any one of the embodiments of the method disclosed herein.

According to a further fourth aspect, there is provided a system for determining a state of a vehicle on a road portion having two or more lanes, the vehicle comprising an Automated Driving System, ADS, feature, the system comprising processing circuitry configured to obtain map data associated with the road portion and to obtain positioning data indicating a pose of the vehicle on the road and to obtain sensor data from a sensor system of the vehicle. Further, the processing circuitry is configured to initialize a plurality of filters for the road portion wherein one filter is initialized per lane of the road portion based on the obtained map data, the obtained positioning data, and the obtained sensor data, wherein each filter indicates an estimated state of the vehicle on the road portion. Even further, the processing circuitry is configured to associate one or more sensor data point(s) in the obtained sensor data to a corresponding map-element of the obtained map data and determine one or more normalized similarity score(s) between the associated obtained map data and the obtained sensor data. In addition, the processing circuitry is configured to determine one or more multivariate time-series data based on the determined one or more normalized similarity score(s), wherein each multivariate time-series data is attributed to a corresponding initialized filter among the plurality of initialized filters. The processing circuitry is additionally configured to provide the one or more multivariate time-series data as input to a trained machine-learning algorithm. The trained machine learning algorithm is configured to determine a confidence probability value for each initialized filter of the plurality of initialized filters by means of a probabilistic classifier and select one of the initialized filters, by comparing the confidence probability values determined for each initialized filter in conjunction with one or more multi-objective optimized coefficient(s), each optimized coefficient being indicative of an optimization between a readiness performance indicator and an accuracy performance indicator for selecting a single initialized filter as an output of the machine learning algorithm indicative of a current state of the vehicle on the road portion. The processing circuitry is further configured to control the ADS feature of the vehicle based on the selected initialized filter.

According to yet another fifth aspect, there is provided a vehicle comprising one or more vehicle-mounted sensors configured to monitor a surrounding environment of the vehicle. The vehicle further comprises a localization system configured to monitor a pose of the vehicle i.e. geographical position and heading of the vehicle on a road. The vehicle further comprises a system according to the fourth aspects and various embodiments of the fourth aspect. The vehicle further comprises an ADS feature for controlling one or more of acceleration, steering, and braking of the vehicle.

Further embodiments of the different aspects are defined in the dependent claims.

It is to be noted that all the embodiments, elements, features and advantages associated with the first aspect also analogously apply to the second, third, fourth and the fifth aspects of the present disclosure.

These and other features and advantages of the present disclosure will in the following be further clarified in the following detailed description.

BRIEF DESCRIPTION OF THE DRAWINGS

Further objects, features and advantages of embodiments of the disclosure will appear from the following detailed description, reference being made to the accompanying drawings. The drawings are not to scale.

DETAILED DESCRIPTION

Figure 1:
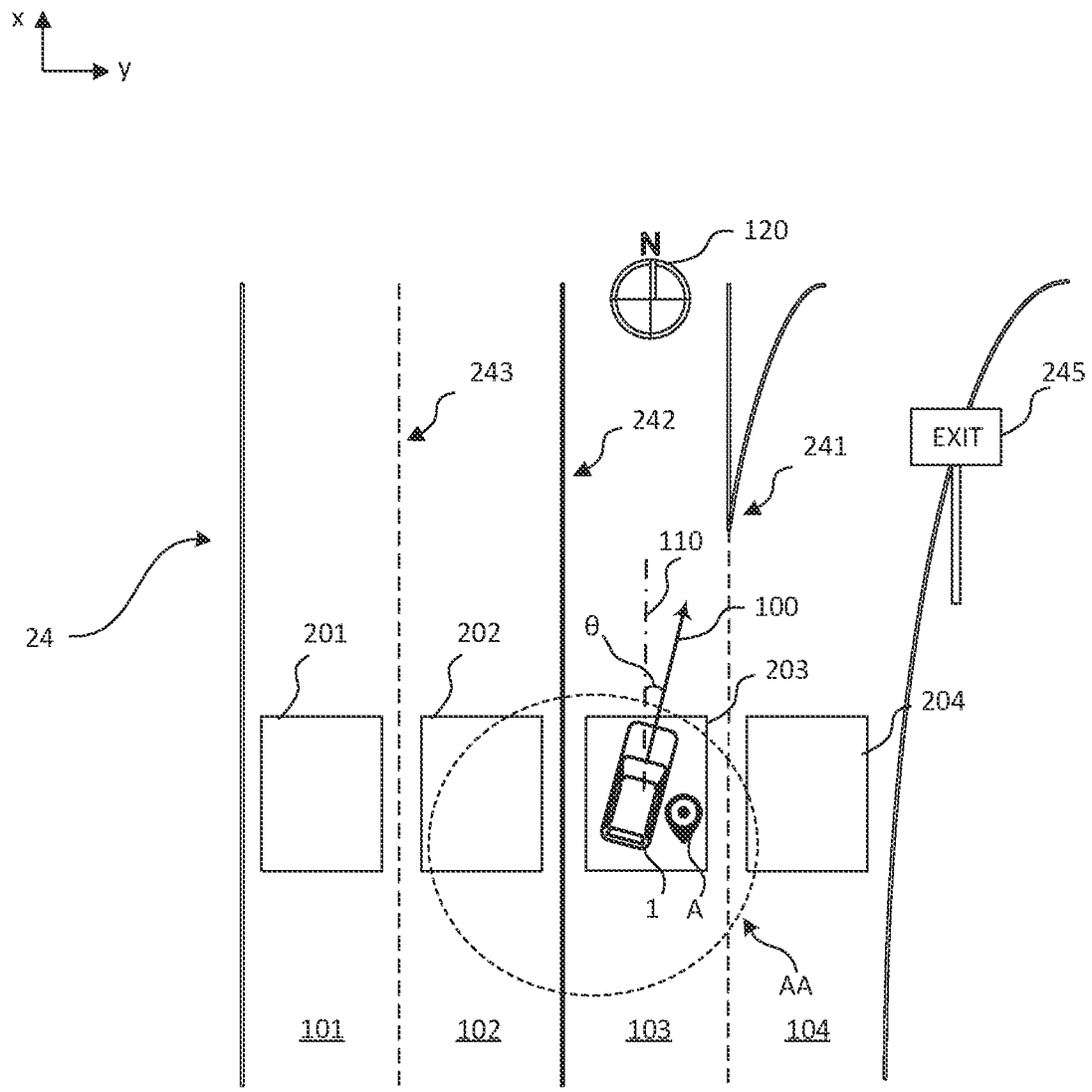
FIG. 1 shows a schematic top view of a road portion having multiple lanes and a vehicle traveling on the road portion in accordance with some embodiments.

Those skilled in the art will appreciate that the steps, services and functions explained herein may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories store one or more programs that perform the steps, services and functions disclosed herein when executed by the one or more processors.

In the following description of exemplary embodiments, the same reference numerals denote the same or similar components. Even though the following disclosure mainly discusses vehicles in the form of cars, the skilled reader readily realizes that the teachings discussed herein are applicable to other forms of vehicles such as trucks, buses and construction equipment.

FIG. 1 illustrates a schematic perspective top views of a vehicle 1 comprising an Automated Driving System (ADS). Moreover, the ADS comprises one or more ADS features that are preferably a level 2 feature or higher according to SAE J3016 levels of driving automation for on-road vehicles. In the present context, an ADS feature may be in the form of an autopilot feature, a traffic jam pilot, a highway pilot, or any other SAE J3016 level 2+ ADS feature. The vehicle 1 may also be referred to as the ego-vehicle.

The vehicle 1 comprises a control system 10 for controlling a driver support function (i.e. an ADS feature) for autonomously maneuvering the vehicle 1 according to several embodiments and aspects of the present disclosure. The control system 10 may be a part of the overall ADS architecture of the vehicle, and may accordingly be a module or component of the ADS. The control system 10 of the vehicle 1 comprises control circuitry 11 or processing circuitry 11 configured to obtain data comprising information about the surrounding environment of the vehicle 1. The vehicle is also provided with a localization system 5 which in communication with the control system 10 are configured to provide an estimation of the vehicle's 1 state or pose i.e. vehicle's geographical position and heading on the road portion 24. The term obtaining is herein to be interpreted broadly and encompasses receiving, retrieving, collecting, acquiring, and so forth.

The state of the vehicle in the context of this disclosure can be construed as having three physical states, namely the longitude, the latitude and the heading of the vehicle. The longitude and the latitude are defined with respect to a geographical coordinate system such as the Cartesian coordinate system and indicate the longitudinal position and lateral position of the vehicle on the road portion. The heading of the vehicle indicates the compass direction of the vehicle with respect to the geographical north 120 and is typically understood as an angle ($\theta$) between a vector 100 of a forward-orientation of the vehicle and a center line 110 extending from the vehicle towards the geographical north. The state of the vehicle may also be referred to as a pose of the vehicle. The pose is in some embodiments represented by a 2D Cartesian position and a yaw of the vehicle (x, y, $\theta$). However, in some embodiments, the pose is a 6D pose where the position is defined by a 3D Cartesian position and the orientation is defined by a roll, pitch, and yaw of the vehicle.

FIG. 1 shows the ego-vehicle 1 travelling on a portion 24 of a road. In this example, the road is in the form of a carriage way having four lanes 101-104, and the road portion 24 is a portion of the carriage way. In several other examples and embodiments the road may be any other type of road e.g. a highway with dual carriageways. The road may also be a motorway, freeway or expressway. The road may also be a country road, rural road or any other carriageway. The road may have a plurality of lanes such as more than one lane in the same travelling direction e.g. two or more lanes or at least one lane in each travelling direction as is usually the case for rural roads.

The control system 10 of vehicle 1 is configured to determine the geographical position and heading of the vehicle on the road portion 24 based on data from the localization system 5 comprising positioning data indicating a pose, i.e. position and orientation, of the vehicle on the road portion 24, map data associated with the road portion 24 and sensor data obtained by the from a perception system i.e. sensor system 6 of the vehicle 1. In several embodiments, the vehicle may utilize a localization system 5 in the form of a suitable satellite based positioning systems, such as either one of a GNSS or a corresponding regional system such as e.g. a GPS, Globalnaya Navigazionnaya Sputnikovaya Sistema (GLONASS), Galileo, Beidou, etc.

The localization system 5 may comprise or be associated with an HD-map module. An HD-map is in the present context to be understood as map comprising data with highly accurate and realistic representations of the road travelled upon by the vehicle 1. In more detail HD-maps may be understood as maps that are particularly built for autonomous driving purposes. These maps have an extremely high precision, oftentimes at a centimeter-level. Moreover, the maps generally contain information such as where the lanes are, where the road boundaries are, where the curves are, how high the curves are, and so forth.

The control system 10 may for in various aspects and embodiments comprise or be associated with an Inertial Measurement Unit (IMU). An IMU may be understood as a device configured to detect linear acceleration using one or more accelerometers and rotational rate using one or more gyroscopes. Thus, in some embodiments, the sensor data may be in the form of sensor data obtained from the IMU. The output from the IMU is then used to estimate a change in the vehicle's pose over time. In more detail, the prediction of the vehicle's pose may be estimated based on a vehicle motion model together with motion sensor data (e.g. data from accelerometers and gyroscopes, which will herein collectively be referred to as motion sensors). The obtained sensor data may additionally comprise information about a state of one or more other external vehicles in the surrounding environment of the ego-vehicle, lane marker geometry on the two or more lanes of the portion 24 of the road, lane marker 241-243 type (e.g. solid, dashed, double marker, etc.) on the portion 24 of the road, traffic sign information 245, road barrier information, etc.

In various aspects and embodiments, the prediction of the pose of the vehicle performed by the control system 10 may comprise using linear or non-linear filtering e.g. by using a Bayesian filter or a combination of multiple Bayesian filters. In several aspects and embodiments, each Bayesian filter may be one of Kalman Filter, Extended Kalman Filter (EKF), Unscented Kalman Filter (UKF), Cubature Kalman Filter (CKF), and Particle Filter (PF). The selection of the Bayesian filters may be based on design factors or quality of obtained sensor data e.g. the linearity of the sensor measurement models which may control the use of suitable filters or filter combinations for different sensors.

In an example shown in FIG. 1, the localization system 5 of the vehicle 1, obtains a GNSS position of the vehicle 1 on the road portion 24. This position is marked as an initial position "A" of the vehicle 1 and a single filter comprising a Bayesian filter or a combination of Bayesian filters are initialized based on the initial position of vehicle 1 as well as the HD-map data of the road portion 24 together with the sensor data to predict the state of the vehicle 1 of the road portion. In several embodiments, the obtained positioning data may comprise an initial longitude, initial latitude and an initial heading of the vehicle 1 connected to the initial GNSS position "A" of the vehicle. Realistically, the GNSS data is usually associated with an uncertainty "AA" indicated by the dashed circle in FIG. 1.

Figure 2:
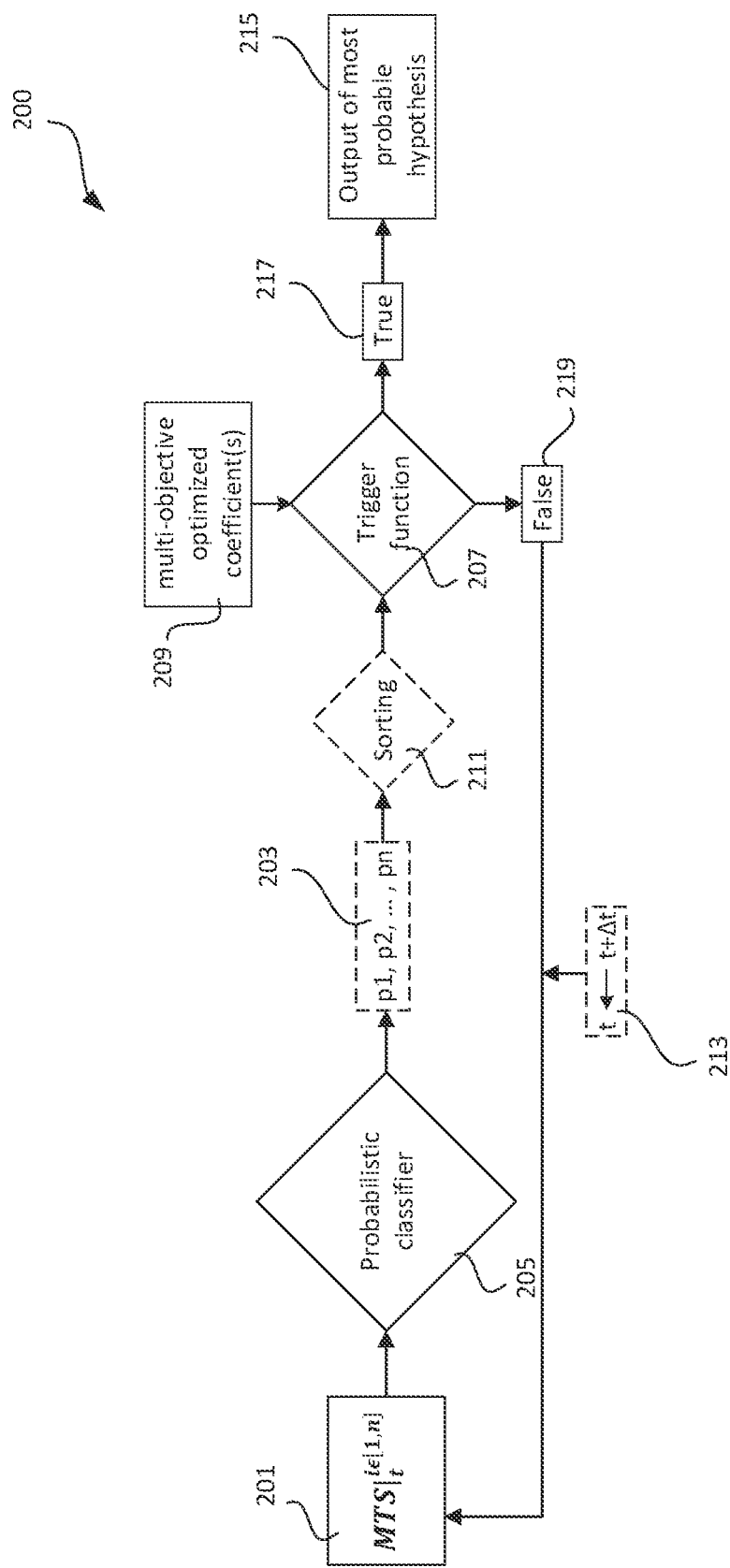
FIG. 2 shows a schematic block diagrams of a machine learning algorithm in accordance with several embodiments.

The inventors have realized that by initializing multiple filters 201-204 for the multi-lane road portion 24 of FIG. 2 such that one filter is initialized per lane 101-104 of the road portion 24, the safety and certainty of the pose estimation of the vehicle 1 on the road portion may be increased noticeably. Even though, this approach requires more computation and processing compared to initializing a single filter around the initial GNSS position, it however allows for a much safer and more certain decision making, especially for controlling the ADS feature of the ego-vehicle 1. In the context of the present disclosure, the outcome or output of each filter 201-204 may also be referred to as a hypothesis. Each hypothesis therefore is an estimation of the pose or state of the vehicle 1 on a designated lane among the plurality of lanes 101-104 of the road portion 24. The inventive method and system presented here therefore scrutinizes each hypothesis to select a most promising hypothesis indicative of the most accurate state of the vehicle on the road portions.

As shown in FIG. 1, by initializing a filter 201-204 per lane 101-104 on the road portion 24, each filter continuously provides an estimation of the state of the vehicle 1 on its designated lane based on the positioning data, obtained sensor data and the HD-map data. Each filter may comprise a Bayesian filter or a combination of Bayesian filters. This way, the most accurate initialized filter amongst the plurality of initialized filters 201-204 can be identified and selected which in turn will indicate the most accurate pose of the vehicle 1 on the road portion 24.

In several embodiments, the initial longitudinal position, initial later position and initial heading (initial pose) comprised in the positioning data connected to the initial position "A" of the vehicle may be obtained from a satellite positioning module, wherein the satellite positioning module may use a Kalman filter or any variants of a Kalman filter such as an extended Kalman filter, an unscented Kalman filter, or a cubature Kalman filter, to continuously estimate the vehicle's pose with inputs of GNSS data, and a predefined motion model of the vehicle. This way initial positioning data of the vehicle 1 comprising initial longitude, initial latitude and initial heading may be obtained. In a prediction stage, the motion model may be used together with the velocity and/or acceleration data e.g. as obtained from the IMU to predict the vehicle's pose. The continuously-obtained positioning data e.g. GNSS data may be applied to the Kalman filter to further estimate and update the vehicle's pose. An output of the satellite positioning module is geodetic vehicle pose, including the initial heading, initial longitude, initial latitude, or in some embodiments an initial altitude of the vehicle. In several embodiments, a pose converter may be used to transform the initial vehicle pose (output of the satellite positioning module) from geodetic coordinates to a local Cartesian coordinate system. As a result, the initial vehicle pose can be represented as a longitudinal position, a lateral position, and a heading.

It should be noted that the filter initialization is designed to be a continuous process for controlling the ADS feature of the ego-vehicle 1 and it is possible that in some scenarios, all or some of the initialized filters and their respective pose estimations will be terminated and a filter re-initialization in all or some of the lanes will be repeated.

However, to select the most accurate initialized filter amongst the plurality of initialized filters 201-204, it is required to establish algorithms which will efficiently perform the selection process.

The inventors have further realized that by using a data-driven approach comprising the use of machine learning (ML) algorithms to identify and select the most promising initialized filter out of the plurality of initialized filters of a multi-lane road, the possibilities of accurately estimating the state of the vehicle on the road portion 24 improves significantly. Further, the data-driven approach of the present disclosure is much more scalable and easier to maintain than any rule-based approach or any algorithm based on human intuition.

Accordingly, hypothesis-inference algorithms and methods according to the present disclosure comprise machine learning algorithms used to influence and promote behavior that increases the possibility for accurately estimating the state of the vehicle in various scenarios including corner case or edge case scenarios involving multiple environmental variables or conditions happening simultaneously or outside the conventional levels. Trained machine learning algorithms in the present context may comprise supervised machine learning algorithms, trained, tested and verified based on conventional real-world data which is obtained through driving the vehicle 1 on various types of roads under a variety of environmental conditions and for suitable periods of time to collect and evaluate the data sets for various scenarios. Particularly, the process of training the ML algorithm may comprises pre-processing, training, testing, and validating phases. To this end, HD-map data, positioning data, various sensor measurements including camera, radar, LIDAR, GNSS, IMU, pose of other external vehicles in the surrounding environment of the ego-vehicle 1, geometry and type of lane markers, traffic signs and traffic information, road barriers, weather forecast, etc. may be employed as input data for training the ML algorithm. Further, reference data, also referred to as "ground-truth" data from the real-world driving data collection which include the actual poses and trajectories of the ego-vehicle may be used. In some aspects and embodiments, unsupervised machine learning algorithms may be used for at least part of the determination of the most accurate hypothesis. In some cases for instance parameters of the trained supervised machine learning algorithm may be used as the initial states for a continuous unsupervised machine learning model based on the large scale dataset.

In several embodiments and aspects in order to assess the likelihood of the difference hypotheses and to be able to select the most promising hypothesis among the plurality of initialized hypotheses, the sensor measurements (e.g. state of one or more other external vehicles in the surrounding environment of the vehicle, lane marker geometry, lane marker type, traffic sign information, road barrier information, IMU data etc.) acquired by the sensor devices are converted into a series of quality measures. This may include associating one or more sensor data point(s) in the obtained sensor data to a corresponding map-element of the obtained map data on the HD-map. To perform such as association of sensor measurements to the map data, both the map elements and the sensor measurements may be converted into a same coordinate system based on the believed pose of the ego vehicle. Further, the association of each sensor measurement i.e. sensor data point associated with each sensor measurement to a map element may further comprise determining one or more similarity score(s) between the associated obtained map data and the obtained sensor data. Determining the one or more similarity score(s) between the associated obtained map data and the obtained sensor data may be performed by computing an association cost value for each sensor data point of the one or more sensor data point(s) associated to a corresponding map element and selecting a sensor data point and map-element combination having the smallest association cost value. In some embodiments if no association could be made or the smallest association cost would be significantly high, a default penalty is assigned to the sensor data point in question e.g. by labeling the sensor data point as an outlier. After the sensor data point-map element associations are made, each association cost is normalized based on the number of sensor data points that were used to provide a normalized similarity score(s) between the associated obtained map data and the obtained sensor data. The normalization may be performed by means of known approaches in the art e.g. by using a Chi-square distribution, with the number of sensor data points corresponding to the degrees of freedom of the Chi-square distribution. The normalized similarity scores may also be referred to as "measurement model qualities" or simply as "model qualities" herein, each measurement model quality being indicative of the similarity between the HD-map elements and perceived sensor data points e.g. sensor measurements of the lane markers relative to each initialized filter 201-204. Each measurement source may have its own model and thus its own measurement model quality. For example, lane marker geometry as a feature represents how well the geometry of the lane markers perceived by the sensors of the vehicle 1 follow the expected geometry as displayed by the HD-map. Using a Chi-square normalization ensures that all model qualities have similar magnitudes, regardless of their number of sensor data points. This way, it is easier to combine model qualities together and compare hypotheses. In some exemplary embodiments the model qualities may be obtained at a frequency of 40 Hz, however the model qualities may be obtained at any other suitable frequencies.

Further, with reference to FIG. 2, in order to provide the required input 201 to the supervised machine learning algorithm 200 for selecting the most accurate initialized filter, the model qualities are used for determining one or more multivariate time-series data 201 based on the determined one or more normalized similarity score(s), wherein each multivariate time-series data may be attributed to a corresponding initialized filter among the plurality of initialized filters. In the present context by the multivariate time-series it is meant a time-series in which each data point is multi-dimensional. In FIG. 2, the number of one or more multivariate time-series data equals "n" which is also the number of active hypotheses. By way of example, for the road portion 24 of FIG. 1, n would be equal to 4, since there are 4 lanes on the road portion and each lane has a designated initialized hypothesis 201-204. Clearly the number of hypothesis and the attributed input 201 may vary accordingly depending on each scenario.

In FIG. 2 the input 201 to the machine learning algorithm 200 comprises multivariate time-series data, 〚MTS〛_t^iϵ [1,n], for "i" being the number of active hypotheses at a current time step "t", wherein i=1, . . . , n.

Determination of the multivariate time-series data may be done based on raw time-series data, or it may be done using some feature extraction or transformation method. Examples of features that can be extracted from time-series data of the model qualities may be temporal averages, mean of values, the variance, standard deviation, the mode of the data or combinations or aggregations of the model qualities. For example, one of the features may be constructed by taking the mean of the two lane marker type model qualities temporally and averaging them into one value. Another feature may be the average variance for all model qualities until a given time step. Any other examples of extraction of features from the model qualities than the ones mentioned above may similarly be performed. The feature extraction or transformation methods may be any of the known methods or processes in the art e.g. random feature transformation by use of random convolutional kernels, or extracting the mean, the standard deviation and the slope of the data within specific time windows. Each 〚MTS〛_t^iϵ[1,n] may be a vector of dimension t×m, wherein m equals the number of features obtained from the quality models.

Other example of feature extraction and transformation may be used depending on the type of data and type of an implemented probabilistic classifier which are assumed to be readily available to the skilled person.

The trained machine learning algorithm in several embodiments and aspects may comprise a supervised machine learning classifier 205, also referred to as a probabilistic classifier herein. In various embodiments, various probabilistic classifiers known in the art may be used such as a Gaussian Naive Bayes, Logistic Regression, Canonical Interval Forest (a state-of-the-art model for multivariate time-series classification), Linear Support Vector Classifier, Kernel Support Vector Classifier, tree ensemble classifiers such as Gradient Boosting Classifier (a popular and widely used model) or Random Forest Classifier, etc. Each of the above-mentioned machine learning probabilistic classifiers 205 are accordingly trained and evaluated to be implemented in the hypothesis inference algorithm presented in this disclosure. Accordingly, by providing the one or more multivariate time-series data as input 201 to the trained machine-learning algorithm 200, a confidence probability value 203 for each initialized filter of the plurality of initialized filters may be determined by means of the trained probabilistic classifier 205. The confidence probability values 203 in FIG. 2 comprises "n" probability values p_(1) p_(2) . . . , p_(n), each calculated for one of the "n" active initialized hypothesis based on the input data 〚MTS〛_t^iϵ[1,n].

As mentioned above, the supervised probabilistic classifier may be applied to each hypothesis of the plurality of hypotheses at given time steps "t". The input fed into the probabilistic classifier are time-dependent features of model qualities i.e. the one or more multivariate time-series data, 〚MTS〛_t^iϵ[1,n], determined based on the determined one or more normalized similarity score(s). The input data may also be referred to as a driving sequence herein, each driving sequence comprising the one or more concurrent multivariate time-series data, each multivariate time-series data being attributed to its corresponding initialized filter.

The output of the probabilistic classifier is a floating probability value between "0" and "1" for each initialized hypothesis. Stated differently, various features extracted from the time-series data of the model qualities as explained earlier may be fed into the supervised probabilistic classifier in order to calculate the confidence probability values for each of the hypotheses. The calculated confidence probability value for each hypothesis i.e. initialized filter is an indicative of accuracy of that specific hypothesis representing the state of the ego vehicle 1 on the road portion. In other words, the trained machine learning algorithm ensures that highest probable hypothesis is selected. This task is fulfilled by a function 207 comprised in the trained machine learning algorithm for assessing the confidence in selecting the most accurate initialized hypothesis based on the output of the probabilistic classifier. This function may also be referred to as a trigger function 207 herein. The trigger function may be a binary function, providing a "true" output class 217 which signifies that a hypothesis is correct, and a "false" output class 219 which signifies that a hypothesis is incorrect. The probabilistic outputs of the probabilistic classifier fed into the trigger function would lead to a belief of the trigger function expressing if a hypothesis is part of the "true" output class or not.

Accordingly, the purpose of the trigger function is deciding if the output from the probabilistic classifier is reliable enough, i.e. "true" output class 217, that it should make a prediction, i.e. selection, of the most accurate hypothesis. Further the trigger function may comprise a "reject" or "false" output class 219 functionality. That is, where the trigger function may not reach a prediction based on the outputs received from the probability classifier. In these scenarios the trigger function 207 is configured to wait for more data to be received from the probabilistic classifier. The time 213 shown in FIG. 2 indicates that when the trigger function 207 could not reach a certain hypothesis selection at the current time "t", it may wait for another time step "Δt" in order to gather further data and evaluate the newly generated driving sequence in the time step "t+Δt". This way a temporal aspect of the problem is taken into account, meaning that by waiting for a longer period of time the multivariate time-series data of the model qualities may provide more information regarding the surroundings of the ego vehicle which could in turn be used for a more confident assessment in selecting the most accurate hypothesis by the trigger function. Thus, the trigger function 207 is implemented by providing a loop of gathering data, evaluating hypotheses, and then either outputting a selection or gathering more data. If the trigger function 207 deems the prediction of the single initialized filter to be reliable enough, then that hypothesis with highest probability is selected as the output 215 of the machine learning algorithm 200.

In some exemplary embodiments the multivariate time series data may be segmented into driving sequences of a certain time length e.g. 30 seconds. With the model qualities obtained at a frequency of 40 Hz, each driving sequence may be segmented into 1200 time steps with each 1-second time length corresponding to 40 time steps. Accordingly, each driving sequence may be evaluated at certain lengths of time, for instance after 1 second has passed. With the probabilistic classifier outputting its first output at the current time step 40 (t=40) corresponding to 1 second at the 40 Hz rate, if the trigger function provides a "true" class output 217 and a selection is made, then the trigger function is only run once for that driving sequence. Otherwise, it will be run at least once more waiting for more data to arrive at the subsequent time steps (t=t+Δt). It should be clear to a skilled person in the art that the above mentioned scenario forms only an example according to some embodiments and any other suitable parameter values may be used instead.

In some embodiments the trigger function may be implemented as a parametrized linear inequality function. In various embodiments and aspects one of the initialized filters having the highest confidence probability may be selected by the trained machine learning algorithm by comparing the confidence probability values 203 determined for each initialized filter. Further, one or more multi-objective optimized coefficient(s) 209 may be introduced to the trigger function 207. Each optimized coefficient 209 is indicative of an optimization, e.g. an optimized trade-off, between a readiness performance indicator and an accuracy performance indicator for selecting a single initialized filter as an output of the machine learning algorithm. In some exemplary embodiments the trigger function may make use of the highest probability output of the classifier i.e. the most probable hypothesis and the second highest probability output of the classifier i.e. the second most probable hypothesis and the difference between these two parameters for evaluating the driving sequences in conjunction with the multi-objective optimized coefficients. Other suitable combinations of the outputs of the probabilistic classifier may also be used by the trigger function for selecting the most suitable hypothesis.

The selected initialized filter is indicative of a current state of the vehicle 1 on the road portion 24. A comparison of the probabilistic outputs is what is used to determine the certainty with which a selection of the single initialized filter can be made. In some embodiments the outputs of the probabilistic classifier may be sorted 211 by magnitude and used as input to the trigger function whose output determines if a selection should be made at this time step or if the model needs more data, i.e. time, to become more confident in that the highest probable hypothesis, given by the probabilistic classifier, is correct.

There are a few advantages to optimize over the two objectives separately instead of merging them together into one objective. Firstly, with a single objective, there may be a need to weight the importance of the readiness and accuracy in advance, which may be difficult in some situations. Moreover, no consideration needs to be made regarding the scaling of the measures, which wouldn't be the case if they were to be optimized together. Finally, the results from a multi-objective execution give a clearer picture of the readiness-accuracy trade-off without having to run the algorithm several times as would be the case in the single-objective scenario.

In some embodiments the readiness performance indicator may comprise an availability performance indicator. In some embodiments the readiness performance indicator may comprise an earliness performance indicator.

The multi-objective optimized coefficients of the trigger function are learned in the training phase of the ML algorithm by optimizing both accuracy and readiness i.e. availability and/or earliness performance measures. In simple terms, the earliness performance measure accounts for making a prediction of an initialized filter as fast as possible. The availability performance measure accounts for making a prediction of an initialized filter in as many scenarios as possible. In other words, availability is defined as the proportion of driving sequences for which the trigger function provides a "true" output evaluation before the sequence has ended i.e. before a set time step e.g. 1 second and no more evaluations can be made. The accuracy performance measure simply accounts for a proportion of correctly-selected single initialized filters by the trained machine learning algorithm i.e. the most accurate initialized filter indicative of the current state of the vehicle 1 on the road portion 24. Thus, a prediction of the most accurate hypothesis for a sequence of input data may be provided as soon as a prediction can be made with certainty, bearing in mind that the more observations are made, the more certain a prediction would be. The problem to be solved by the multi-objective algorithm then becomes finding the trade-off between accuracy and readiness. The coefficients of the trigger function are established based on the multi-objective optimization in the training phase of the trained machine learning algorithm and the learned coefficients are then used in the test stage to find the best hypothesis in conjunction with the confidence probability values outputted by the probabilistic classifier.

In several embodiments and examples, the multi-objective optimization algorithm may be implemented by using a genetic algorithm and more specifically NSGA2 algorithm. NSGA2 stands for (Non-Dominated Sorting Genetic Algorithm 2) which is a genetic algorithm for producing non-dominated solutions in multi-objective optimization. To choose one of the solutions from the non-dominated solution set received, an achievement scalarization function as known in the art may be used. In summary, an optimal solution will be returned based on a vector of weights for accuracy and availability, as well as for accuracy and earliness performance indicators. In various embodiments and examples, the weights may be set by customizing the preference for accuracy versus availability or earliness. For instance, the weights may be set by choosing the accuracy performance indicator to be more important than availability and/or earliness measures. In various embodiments, the training of the probabilistic classifier, the optimization of the trigger function and testing of the complete trained ML model may be an iterative process performed continuously on the obtained data sequences.

Figure 3A:
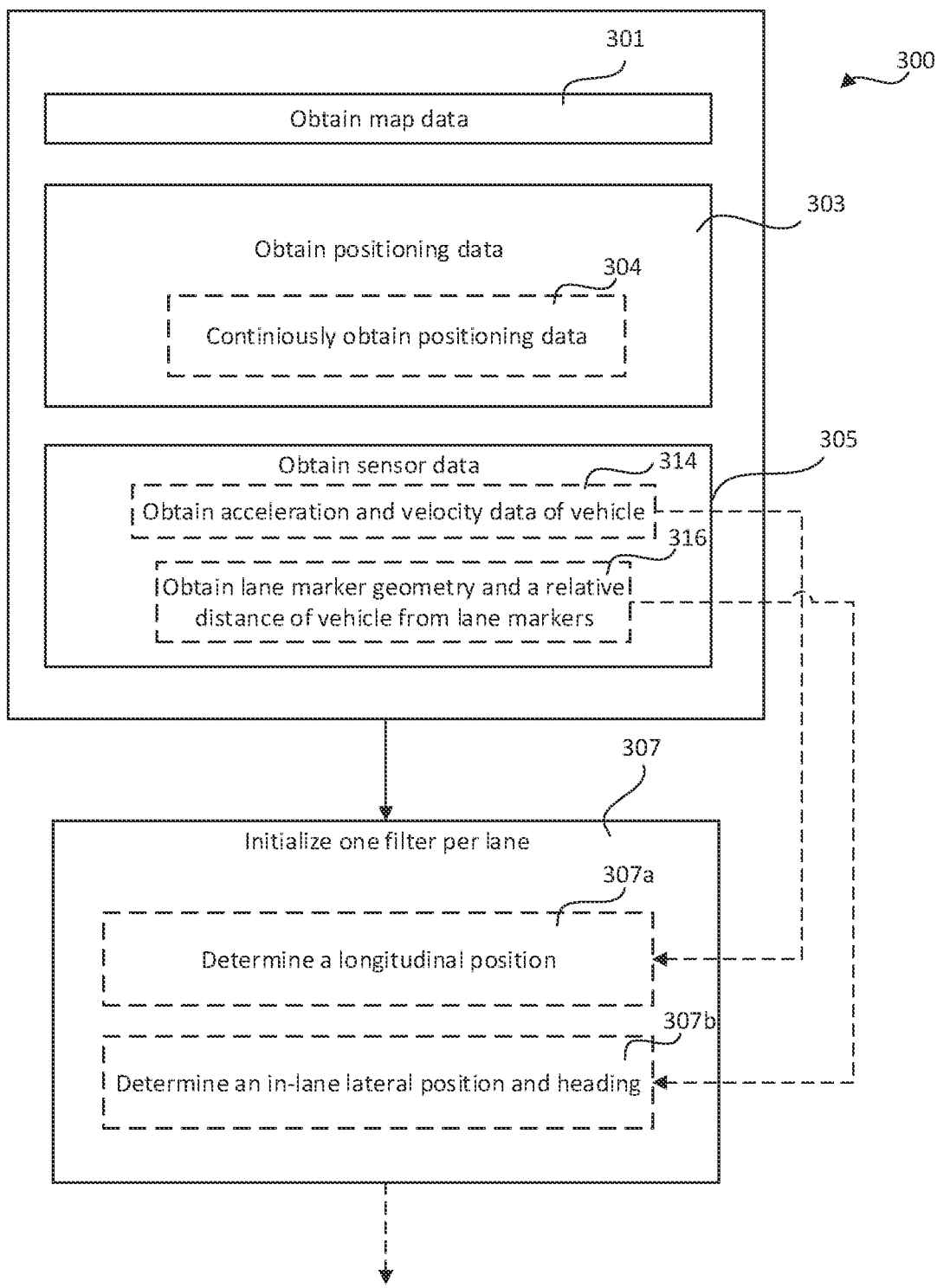
FIGS. 3a-b are schematic flowcharts illustrating a method in accordance with several embodiments.
Figure 3B:
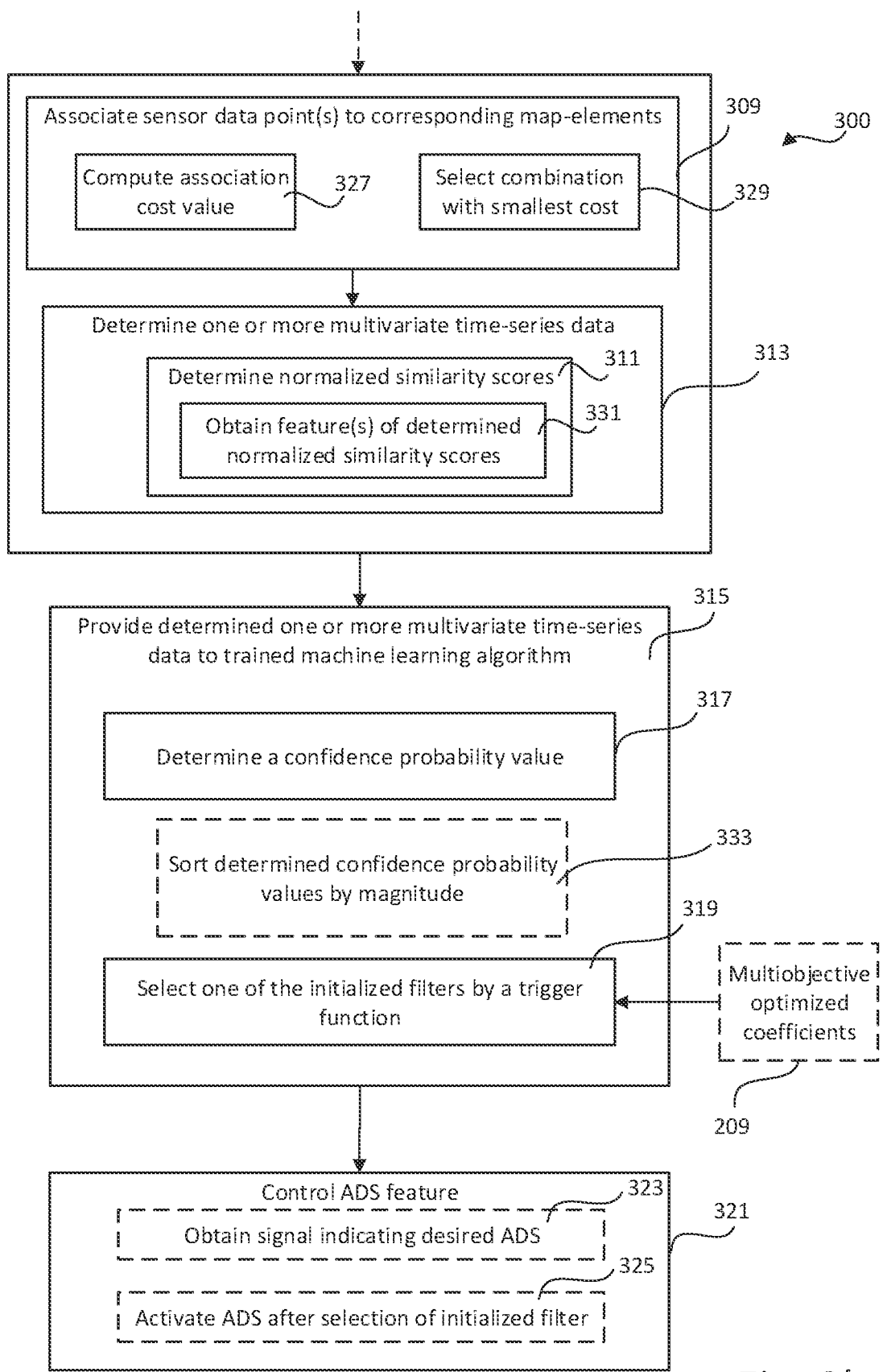

FIGS. 3a-b show flowcharts of a method 300 according to various aspects and embodiments of the present disclosure for determining a state of a vehicle 1 on a road portion 24 having two or more lanes 101-104. The method 300 comprises obtaining 301 map data, associated with the road portion 24. As mentioned earlier the map data is typically the HD-map data comprising data with highly accurate and realistic representations of the road portion 24. The method further comprises obtaining 303 positioning data indicating a pose of the vehicle 1 on the road. More specifically, the initial GNSS position "A" of the vehicle 1 on the road portion 24 is obtained by the localization system 5. In several embodiments, the positioning data comprises an initial longitude, initial latitude and an initial heading of the vehicle 1 connected to the initial GNSS position "A" of the vehicle.

Figure 4:
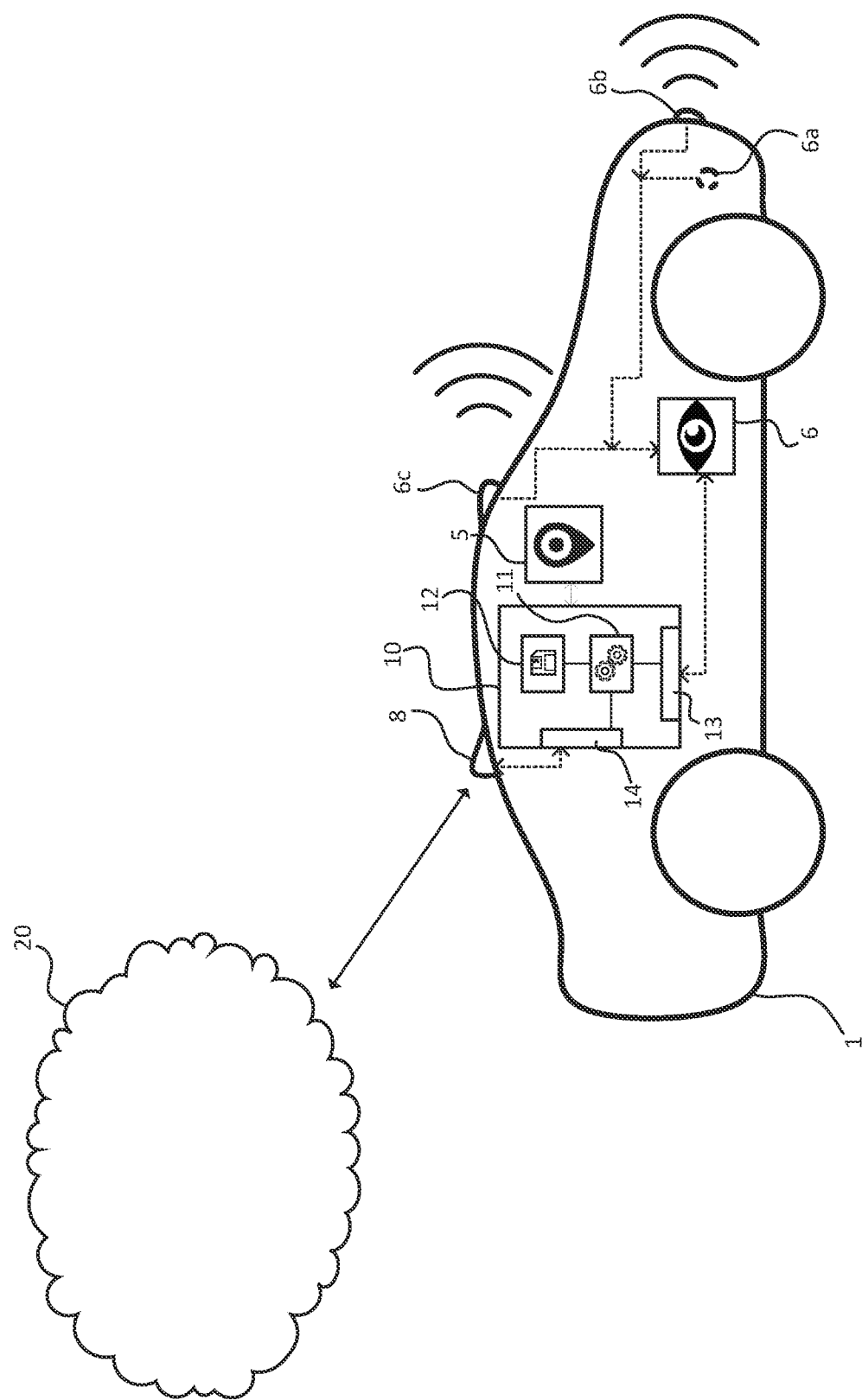
FIG. 4 shows a schematic side view illustration of the vehicle comprising the control system in accordance with some embodiments.

The control system 10 is configured to perform the method step of obtaining 305 sensor data from a sensor system i.e. perception system 6 of the vehicle 1 comprising a variety of different sensors such as sensors 6a-6c illustrated for the vehicle 1 of FIG. 4.

In some embodiments obtaining 305 sensor data may comprise obtaining 314 at least one of acceleration and velocity of the vehicle 1. By obtaining the velocity and/or acceleration data as well as a temporal positioning profile of the vehicle 1, an in-lane longitudinal position (x) of the vehicle 1 on the road portion 24 can be determined.

Further, in several aspects and embodiments, obtaining 305 sensor data may comprise obtaining 316 the lane marker geometry and a relative distance of the vehicle 1 from the lane markers 241-243 on the road portion 24. By retrieving the information about the lane markers on the road portion and calculating the relative distance of the vehicle from different lane marker types (e.g. the lane markers located on a right side and/or on a left side of the vehicle), an in-lane lateral position (y) and in-lane heading 100 of the vehicle 1 on the road portion 24 may be determined. By determining the longitudinal and in-lane lateral position of the vehicle, the heading of the vehicle can be determined. To determine the heading 100 of the vehicle, a tangent of the angle "θ" along the center line 110 (being substantially parallel with the extension of at least one of the lanes on the road portion 24) of the vehicle is calculated. As a result, the direction of the tangent 100 along the lane is determined as the initialization for the heading of the vehicle. The method further comprises initializing 307 a plurality of filters 201-204 for the road portion wherein one filter is initialized per lane 101-104 of the road portion 24 based on the obtained map data, the obtained positioning data, and the obtained sensor data, wherein each filter 201-204 indicates an estimated state of the vehicle 1 on the road portion 24. As mentioned earlier each filter may employ a Bayesian filter or a combination of different Bayesian filters suitable for the specific scenario to estimate the state of the vehicle 1. In some embodiments, the initializing 307 of the filters 201-204 per lane 101-104 of the road portion 24 may further comprise, for each filter continuously obtaining 304 the positioning data of the vehicle 1 on the road over time. In other words, obtaining the initial GNSS position "A" of the vehicle 1 on the road portion 24 is an iterative process and the localization system 5 is configured to repeatedly acquire the initial position "A" over a certain period of time, in predetermined intervals, or based on any other suitable temporal scheme. This way the certainty of the obtained positioning data is noticeably elevated which contributes to reducing the margin of error when estimating the vehicle pose by each filter 201-204. In some embodiments each filter may be initialized based on the determined 307a, 307b longitudinal position (x) and in-lane lateral position (y) and heading 100 of the vehicle 1 on the road portion for each filter 201-204. The method continuous to FIG. 3b wherein it is shown that the method 300 further comprises associating 309 one or more sensor data point(s) in the obtained sensor data to a corresponding map-element of the obtained map data. Even further, the method 300 comprises determining 311 one or more normalized similarity score(s) between the associated obtained map data and the obtained sensor data. The method 300 further comprises determining 313 one or more multivariate time-series data based on the determined one or more normalized similarity score(s), wherein each multivariate time-series data is attributed to a corresponding initialized filter among the plurality of initialized filters. Additionally, the method comprises providing 315 the one or more multivariate time-series data as input 201 to a trained machine-learning algorithm 200. The trained machine learning algorithm 200 is configured for determining 317 a confidence probability value 203 e.g. including $p\_(1)$ $p\_(2)$ $p\_(3)$ $p\_(4)$, for each initialized filter of the plurality of initialized filters 201-204 (4 filters in the example of FIG. 1, with n=4) by means of a probabilistic classifier 205. Further, the machine learning algorithm is configured for selecting 319 one of the initialized filters, by comparing the confidence probability values determined for each initialized filter in conjunction with one or more multi-objective optimized coefficient(s) 209, each optimized coefficient being indicative of an optimization, e.g. an optimized trade-off, between a readiness performance indicator and an accuracy performance indicator for selecting a single initialized filter as an output 215 of the machine learning algorithm. The output of the machine learning algorithm is indicative of a current state of the vehicle on the road portion. The method further comprises controlling 321 the ADS feature of the vehicle based on the selected initialized filter.

In some embodiments and aspects the method 300 may further comprise obtaining 323 a signal indicative of a desired activation of the ADS feature. Controlling 321 the ADS feature may comprise activating 325 the ADS feature after the selection of the initialized filter has been made and using the selected initialized filter to indicate the vehicle's state on the road portion 24. Accordingly, controlling 321 the ADS feature may comprise at least controlling 321 one or more of acceleration, steering, and braking of the vehicle.

In some embodiments the method 300 may further comprise determining 311 the one or more similarity score(s) between the associated obtained map data and the obtained sensor data by computing 327 an association cost value for each sensor data point of the one or more sensor data point(s) associated to a corresponding map element and selecting 329 a sensor data point and map-element combination having the smallest association cost value.

In several embodiments, the method 300 may further comprise determining 313 the one or more multivariate time-series data based on the determined one or more normalized similarity score(s) by obtaining 331 one or more time-dependent feature(s) of each determined normalized similarity score.

Executable instructions for performing these functions are, optionally, included in a non-transitory computer-readable storage medium or other computer program product configured for execution by one or more processors.

In some embodiments, the trained machine learning algorithm may further be configured for sorting 333 the determined confidence probability values for the plurality of the initialized filters based on the confidence level or magnitude of each determined confidence probability value.

In several embodiments for each multi-objective optimized coefficient the readiness performance indicator may comprise an availability performance indicator comprising a proportion of the one or more multivariate time-series data for which a selection of a single initialized filter is performed by the trained machine learning algorithm, i.e. the trigger function. In other words the availability performance measure accounts for making a prediction of an initialized filter in as many scenarios as possible. In some embodiments, selection of a single initialized filter for a proportion of the one or more multivariate time-series data may be performed within or before a set period of time, as discussed earlier with respect to time steps.

In several embodiments for each multi-objective optimized coefficient the readiness performance indicator may comprise an earliness performance indicator comprising an average fraction passed of the one or more multivariate time-series data before a selection of a single initialized filter is performed by the trained machine learning algorithm i.e. the trigger function. In other words the earliness performance measure accounts for making a prediction of an initialized filter as fast as possible.

Further, in several embodiments, the accuracy performance indicator may comprise a proportion of correctly-selected single initialized filters by the trained machine learning algorithm, i.e. the trigger function, being indicative of the current state of the vehicle on the road portion. In other words, the accuracy performance measure simply accounts for a proportion of correctly-selected single initialized filters.

FIG. 4 is a schematic side view of a vehicle 1 comprising a control system 10 (control device 10) for determining a vehicle pose. The vehicle 1 further comprises a perception system 6 and a localization system 5. A perception system 6 is in the present context to be understood as a system responsible for acquiring raw sensor data from on sensors 6a, 6b, 6c such as cameras, LIDARs and RADARs, ultrasonic sensors, and converting this raw data into scene understanding. In particular, the vehicle 1 has at least one vehicle-mounted camera 6c for capturing images of (at least a portion of) a surrounding environment of the vehicle. The localization system 5 is configured to monitor a geographical position and heading of the vehicle, and may in the form of a Global Navigation Satellite System (GNSS), such as a GPS. However, the localization system may alternatively be realized as a Real Time Kinematics (RTK) GPS in order to improve accuracy. Moreover, in the present context the vehicle 1 is assumed to have access to a digital map (e.g. a HD-map), either in the form of a locally stored digital map or via a remote data repository accessible via an external communication network 20 (e.g. as a data stream). In some embodiments, the access to the digital map may for example be provided by the localization system 5.

The control system 10 comprises one or more processors 11, a memory 12, a sensor interface 13 and a communication interface 14. The processor(s) 11 may also be referred to as a control circuit 11 or control circuitry 11 or processing circuitry 11. The control circuit 11 is configured to execute instructions stored in the memory 12 to perform a method for determining a state of an ADS-equipped vehicle on a road portion having one or more lanes according to any one of the embodiments disclosed herein. In more detail, the processing circuitry 11 is configured to perform the method steps of the method 300 in FIGS. 3a-b and with reference to FIG. 2 to select a single initialized filter by the ML algorithm on the multi-lane 101-104 stretch of road 24. The memory 12 of the control device 10 can include one or more (non-transitory) computer-readable storage mediums, for storing computer-executable instructions, which, when executed by one or more computer processors 11, for example, can cause the computer processors 11 to perform the techniques described herein. The memory 12 optionally includes high-speed random access memory, such as DRAM, SRAM, DDR RAM, or other random access solid-state memory devices; and optionally includes non-volatile memory, such as one or more magnetic disk storage devices, optical disk storage devices, flash memory devices, or other non-volatile solid-state storage devices.

Further, the vehicle 1 may be connected to external network(s) 20 via for instance a wireless link (e.g. for retrieving map data). The same or some other wireless link may be used to communicate with other external vehicles in the vicinity of the vehicle or with local infrastructure elements. Cellular communication technologies may be used for long range communication such as to external networks and if the cellular communication technology used have low latency it may also be used for communication between vehicles, vehicle to vehicle (V2V), and/or vehicle to infrastructure, V2X. Examples of cellular radio technologies are GSM, GPRS, EDGE, LTE, 5G, 5G NR, and so on, also including future cellular solutions. However, in some solutions mid to short range communication technologies are used such as Wireless Local Area (LAN), e.g. IEEE 802.11 based solutions. ETSI is working on cellular standards for vehicle communication and for instance 5G is considered as a suitable solution due to the low latency and efficient handling of high bandwidths and communication channels.

The present disclosure has been presented above with reference to specific embodiments. However, other embodiments than the above described are possible and within the scope of the disclosure. Different method steps than those described above, performing the method by hardware or software, may be provided within the scope of the disclosure. Thus, according to an exemplary embodiment, there is provided a non-transitory computer-readable storage medium storing one or more programs configured to be executed by one or more processors of a vehicle control system, the one or more programs comprising instructions for performing the method according to any one of the above-discussed embodiments. In several aspects and embodiments, there is provided a computer program product comprising instructions which, when the program is executed by one or more processors of a processing system, causes the processing system to carry out the method according to any one of the embodiments of the method of the present disclosure.

Alternatively, according to another exemplary embodiment a cloud computing system can be configured to perform any of the methods presented herein. The cloud computing system may comprise distributed cloud computing resources that jointly perform the methods presented herein under control of one or more computer program products.

Generally speaking, a computer-accessible medium may include any tangible or non-transitory storage media or memory media such as electronic, magnetic, or optical media—e.g., disk or CD/DVD-ROM coupled to computer system via bus. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

The processor(s) 11 (associated with the control device 10) may be or include any number of hardware components for conducting data or signal processing or for executing computer code stored in memory 12. The device 10 may have an associated memory 12, and the memory 12 may be one or more devices for storing data and/or computer code for completing or facilitating the various methods described in the present description. The memory may include volatile memory or non-volatile memory. The memory 12 may include database components, object code components, script components, or any other type of information structure for supporting the various activities of the present description. According to an exemplary embodiment, any distributed or local memory device may be utilized with the systems and methods of this description. According to an exemplary embodiment the memory 12 is communicably connected to the processor 11 (e.g., via a circuit or any other wired, wireless, or network connection) and includes computer code for executing one or more processes described herein.

It should be appreciated that the ego-vehicle 1 further comprises a sensor interface 13 which may also provide the possibility to acquire sensor data directly or via dedicated sensor control circuitry 6 in the vehicle. The vehicle 1 also comprises a communication/antenna interface 14 which may further provide the possibility to send output to a remote location (e.g. remote operator or control centre) by means of an antenna 8. Moreover, some sensors in the vehicle may communicate with the control device 10 using a local network setup, such as CAN bus, I2C, Ethernet, optical fibres, and so on. The communication interface 14 may be arranged to communicate with other control functions of the vehicle and may thus be seen as control interface also; however, a separate control interface (not shown) may be provided. Local communication within the vehicle may also be of a wireless type with protocols such as WiFi, LoRa, Zigbee, Bluetooth, or similar mid/short range technologies.

Accordingly, it should be understood that parts of the described solution may be implemented either in the vehicle, in a system located external the vehicle, or in a combination of internal and external the vehicle; for instance in a server in communication with the vehicle, a so called cloud solution. In some examples, the ML algorithm may be implemented in the processing circuitry 11. In some examples, sensor data may be sent to an external system, wherein the external system comprises the ML algorithm to select the single initialized filter. The different features and steps of the embodiments may be combined in other combinations than those described.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the disclosure may be at least in part implemented by means of both hardware and software, and that several "means" or "units" may be represented by the same item of hardware.

Although the figures may show a specific order of method steps, the order of the steps may differ from what is depicted. In addition, two or more steps may be performed concurrently or with partial concurrence. Such variation will depend on the software and hardware systems chosen and on designer choice. All such variations are within the scope of the disclosure. Likewise, in some cases some of the software implementations may be accomplished with standard programming techniques with rule-based logic and other logic to accomplish the various connection steps, processing steps, comparison steps and decision steps. The above mentioned and described embodiments are only given as examples and should not be limiting to the present disclosure. Other solutions, uses, objectives, and functions within the scope of the disclosure as claimed in the below described patent embodiments should be apparent for the person skilled in the art.

The invention claimed is:

1. A method for determining a state of a vehicle on a road portion having two or more lanes, the vehicle comprising an Automated Driving System (ADS) feature, the method comprising:
    obtaining map data associated with the road portion;
    obtaining positioning data indicating a pose of the vehicle on the road;
    obtaining sensor data from a sensor system of the vehicle;
    initializing a plurality of filters for the road portion wherein one filter is initialized per lane of the road portion based on the obtained map data, the obtained positioning data, and the obtained sensor data, wherein each filter indicates an estimated state of the vehicle on the road portion;
    associating one or more sensor data point(s) in the obtained sensor data to a corresponding map-element of the obtained map data;
    determining one or more normalized similarity score(s) between the associated obtained map data and the obtained sensor data;
    determining one or more multivariate time-series data based on the determined one or more normalized similarity score(s), wherein each multivariate time-series data is attributed to a corresponding initialized filter among the plurality of initialized filters; and
    providing the one or more multivariate time-series data as input to a trained machine-learning algorithm; wherein the trained machine learning algorithm is configured for:
    determining a confidence probability value for each initialized filter of the plurality of initialized filters by means of a probabilistic classifier;
    selecting one of the initialized filters, by comparing the confidence probability values determined for each initialized filter in conjunction with one or more multi-objective optimized coefficient(s), each optimized coefficient being indicative of an optimization between a readiness performance indicator and an accuracy performance indicator for selecting a single initialized filter as an output of the machine learning algorithm indicative of a current state of the vehicle on the road portion; wherein the method further comprises:
    controlling the ADS feature of the vehicle based on the selected initialized filter.

2. The method according to claim 1, wherein each initialized filter is one of a Bayesian filter and a combination of multiple Bayesian filters.

3. The method according to claim 2, wherein each Bayesian filter is one of Kalman Filter, Extended Kalman Filter (EKF), Unscented Kalman Filter (UKF), Cubature Kalman Filter (CKF), and Particle Filter (PF).

4. The method according to claim 1, wherein the obtained sensor data comprises information about a state of one or more other vehicles in the surrounding environment of the vehicle, lane marker geometry, lane marker type, traffic sign information, road barrier information, and Inertial Measurement Unit (IMU) data.

5. The method according to claim 1, wherein the method further comprises determining one or more normalized similarity score(s) between the associated obtained map data and the obtained sensor data by:
    computing an association cost value for each sensor data point of the one or more sensor data point(s) associated to a corresponding map element; and
    selecting a sensor data point and map-element combination having the smallest association cost value.

6. The method according to claim 1, wherein the method further comprises determining the one or more multivariate time-series data based on the determined one or more normalized similarity score(s) by obtaining one or more time-dependent feature(s) of each determined normalized similarity score.

7. The method according to claim 1, wherein the trained machine learning algorithm is further configured for:

sorting the determined confidence probability values for the plurality of the initialized filters based on the confidence level of each determined confidence probability value.

8. The method according to claim 1, wherein for each optimized coefficient:
the readiness performance indicator comprises any one of an availability performance indicator comprising a proportion of the one or more multivariate time-series data for which a selection of a single initialized filter is performed by the trained machine learning algorithm; and an earliness performance indicator comprising an average fraction passed of the one or more multivariate time-series data before a selection of a single initialized filter is performed by the trained machine learning algorithm; and further for each optimized coefficient:
the performance accuracy indicator comprises a proportion of correctly-selected single initialized filters by the trained machine learning algorithm, being indicative of the current state of the vehicle on the road portion.

9. The method according to claim 1, wherein the map data comprises HD map data.

10. A non-transitory computer-readable storage medium storing one or more programs configured to be executed by one or more processors of an in-vehicle processing system, the one or more programs comprising instructions for performing the method according to claim 1.

11. A system for determining a state of a vehicle on a road portion having two or more lanes, the vehicle comprising an Automated Driving System (ADS) feature, and the system comprising processing circuitry configured to:
obtain map data associated with the road portion;
obtain positioning data indicating a pose of the vehicle on the road;
obtain sensor data from a sensor system of the vehicle;
initialize a plurality of filters for the road portion wherein one filter is initialized per lane of the road portion based on the obtained map data, the obtained positioning data, and the obtained sensor data, wherein each filter indicates an estimated state of the vehicle on the road portion;
associate one or more sensor data point(s) in the obtained sensor data to a corresponding map-element of the obtained map data;
determine one or more normalized similarity score(s) between the associated obtained map data and the obtained sensor data;
determine one or more multivariate time-series data based on the determined one or more normalized similarity score(s), wherein each multivariate time-series data is attributed to a corresponding initialized filter among the plurality of initialized filters; and
provide the one or more multivariate time-series data as input to a trained machine-learning algorithm; wherein the trained machine learning algorithm is configured to:
determine a confidence probability value for each initialized filter of the plurality of initialized filters by means of a probabilistic classifier;
select one of the initialized filters, by comparing the confidence probability values determined for each initialized filter in conjunction with one or more multi-objective optimized coefficient(s), each optimized coefficient being indicative of an optimization between a readiness performance indicator and an accuracy performance indicator for selecting a single initialized filter as an output of the machine learning algorithm indicative of a current state of the vehicle on the road portion; wherein the processing circuitry is further configured to:
control the ADS feature of the vehicle based on the selected initialized filter.

12. The system according to claim 11, wherein the processing circuitry is further configured to:
compute an association cost value for each sensor data point of the one or more sensor data point(s) associated to a corresponding map element; and
select a sensor data point and map-element combination having the smallest association cost value.

13. The system according to claim 11, wherein the processing circuitry is further configured to:
determine the one or more multivariate time-series data based on the determined one or more normalized similarity score(s) by obtaining one or more time-dependent feature(s) of each determined normalized similarity score.

14. The system according to claim 11, wherein for each optimized coefficient:
the readiness performance indicator comprises any one of an availability performance indicator comprising a proportion of the one or more multivariate time-series data for which a selection of a single initialized filter is performed by the trained machine learning algorithm; and an earliness performance indicator comprising an average fraction passed of the one or more multivariate time-series data before a selection of a single initialized filter is performed by the trained machine learning algorithm; and further for each optimized coefficient:
the performance accuracy indicator comprises a proportion of correctly-selected single initialized filters by the trained machine learning algorithm, being indicative of the current state of the vehicle on the road portion.

15. A vehicle comprising:
one or more vehicle-mounted sensors configured to monitor a surrounding environment of the vehicle;
a localization system configured to monitor a pose of the vehicle on a road; and
a system according to claim 11.

* * * * *